Sept. 6, 1966     M. KOOS, JR     3,270,740
OVEN
Filed Oct. 27, 1964     3 Sheets-Sheet 1

INVENTOR.
MILTON KOOS, JR.
BY Darby & Darby
ATTORNEYS

Sept. 6, 1966 M. KOOS, JR 3,270,740
OVEN
Filed Oct. 27, 1964 3 Sheets-Sheet 3

INVENTOR.
MILTON KOOS, JR.
BY
*Darley & Darley*
ATTORNEYS

3,270,740
OVEN
Milton Koos, Jr., New York, N.Y., assignor to
Arthur Tamaroff, Forest Hills, N.Y.
Filed Oct. 27, 1964, Ser. No. 406,743
7 Claims. (Cl. 126—275)

This invention relates to apparatus for heating frozen foods. More specifically, the present invention relates to a portable-type oven which may be used on top of a gas stove for the purpose of heating frozen foods such as "TV dinners" or the like.

The use of frozen foods has gained wide spread popularity. Today, entire dinners are fully prepared and frozen so that they may thereafter be heated, without thawing and served. Such dinners are popularly known as "TV dinners," and have gained considerable commercial acceptance since they provide a three or four course hot meal with no preparation other than insertion of the frozen package into a hot oven.

Despite the above, the other advantages, it has been found that a significant drawback to frozen dinners resides in the time required for the preparation of the food. For example, including the time required to properly warm up the oven, it normally requires about forty-five minutes to heat a frozen dinner. Although in many cases this represents a sizable saving in time, there are instances in which this time requirement has been found unsatisfactory, and for this reason the utility and acceptance of such frozen food products has been limited.

Accordingly, the main object of the present invention is to provide a device for preparing frozen dinners, or the like, in a substantially shorter time than heretofore possible.

Another object of the invention is to provide a small portable-type oven which may conveniently be used on the top of a stove for the preparation of frozen foods.

Another object of the invention is to provide a small portable-type oven for the preparation of pre-frozen foods, wherein the temperature within the oven may be controlled with ease.

According to the invention, the above and other objects of the invention are accomplished by the use of a small portable-type oven adapted to be placed over the conventional gas burner of a stove. The oven includes a tray for holding the frozen food and a baffle structure which causes the interior of the oven and the frozen food to be heated by the hot gases from the gas flame. This process differs materially from the radiation heating which takes place in a conventional oven, and, as a result, the frozen food may be fully prepared in approximately one third the time previously required.

As a further feature of the invention, an external oven thermometer may be provided to indicate the temperature within the oven. Thus, by observing the oven thermometer and manually regulating the gas flame, the user can control the temperature in the oven throughout a relatively wide range to meet different conditions prescribed by various manufacturers of frozen food products.

The manner in which the above and other objects of the invention are accomplished is more fully described below with reference to the following drawings, wherein.

Figure 1:
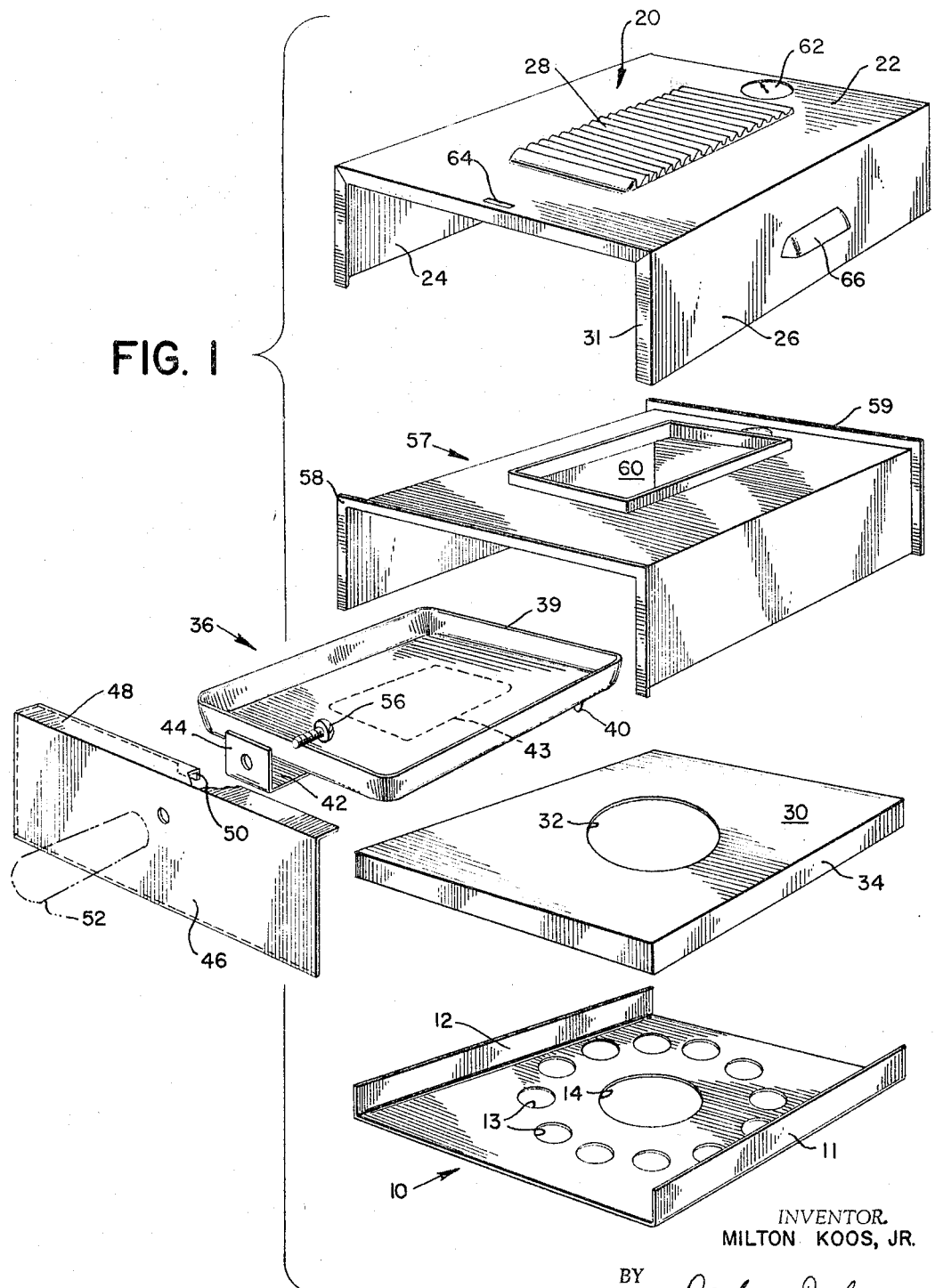
FIGURE 1 is a perspective view of an oven according to the invention.
Figure 2:
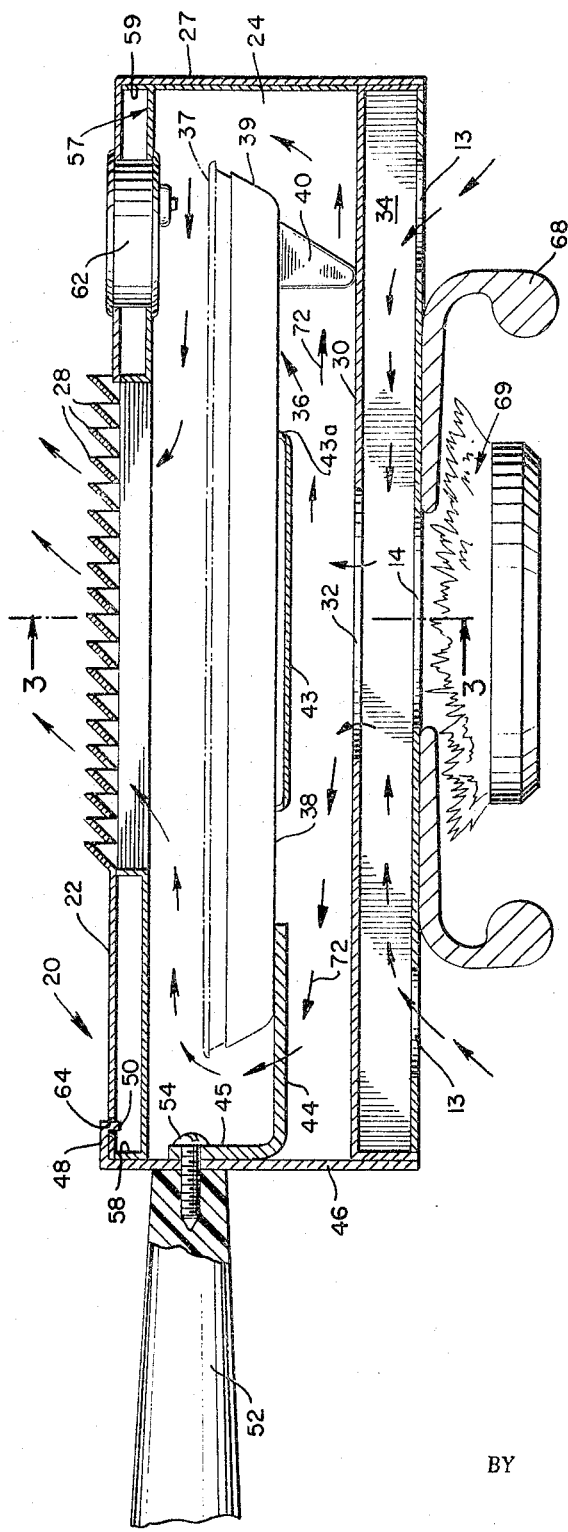
FIGURE 2 is a side sectional view of the oven illustrating the manner in which the hot gases and air heat the frozen food.
Figure 3:
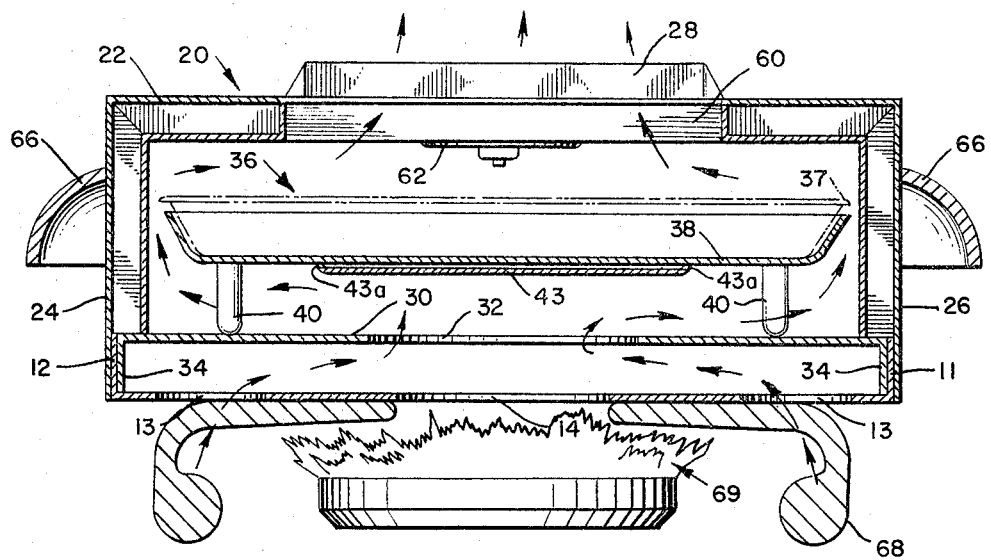
FIGURE 3 is a view along the line 3—3 of FIGURE 2.

Referring to the drawing, the oven according to the invention includes a base plate 10 having two opposing upstanding rims 11 and 12. The area of base plate 10 should be slightly greater than that of the largest frozen food product which it is desired to heat. The base 10 includes air input holes 13 circumferentially spaced around a central enlarged gas inlet aperture 14. As will be explained in greater detail below, the purpose of the air inlet holes 13 is to admit air which can be mixed with the gaseous flames flowing through aperture 14, and the total area of the holes 13 should be equal to or greater than the area of aperture 14.

The base plate 10 is secured to the bottom of a cover member 20 which includes a rectangular top 22 transverse sides 24 and 26, and an end plate 27. The top 22 also includes a plurality of longitudinally arrayed louvers 28 which serve as an exhaust for the gases and air entering through aperture 14 and holes 13, respectively. A flange 31 extends around the entire front opening of the cover 20.

A baffle 30 is secured to cover member 20 immediately above base plate 10. Baffle 30 includes a central aperture 32, slightly greater in area than aperture 14, and a bottom peripheral flange 34 which is permanently secured to sides 24 and 26 of cover 20 by conventional means such as rivets or welding. The upstanding rims 11 and 12 of base plate 10 are similarly secured to the corresponding portions of the interior surface of baffle flange 34.

A rectangular tray 36 is used to retain the frozen food indicated at 37, while it is being heated within the oven. The tray may be approximately the same size as the largest product which it is desired to heat, and includes a bottom plate 38 integrally formed with a peripheral rim 39. Tray 36 also includes two rear legs 40 which are suitably shaped to facilitate sliding of the tray on baffle 30. Legs 40 may be welded or otherwise attached to tray 36. A square, protective plate 43 is welded or otherwise connected to the bottom of tray 36 so that there is a small air space between the plate 43 and tray 36 to prevent overheating of the portion of the tray immediately above baffle aperture 32. In a preferred embodiment, the corners of the plate 43 may be bent toward tray 36 as illustrated at 43a, and the corners 43a welded to the undersurface of the tray. Plate 43 will also serve its intended purpose if it is positioned interior of the tray.

A thin L-shaped connecting strip 44, including a transverse portion 45, extends outwardly from the forward portion of tray 36. Connector strip 42 is suitably secured to tray 36 in any desired manner, or may be made integral therewith. Connector portion 45 is permanently secured to a vertical front panel 46 which includes a small horizontal ridge 48 from which a downwardly depending tab 50 extends. A suitable handle 52 is secured to front panel 46 by a screw 54 threadedly received by handle 52 and extending through panel 46 and connector portion 45 to form a permanent engagement between the front panel 46 and tray 36.

A liner 57 having the same shape as cover 20, is placed within the cover immediately above baffle 30 for insulation purposes. Liner 57 includes front and rear spacing rims 58 and 59, respectively, and a rimmed central aperture 60 coinciding with the exhaust louvers 28 of cover 20.

A conventional oven thermometer 62 extends through the top 22 of cover 20 and insulation liner 57 to provide an external indication of the temperature within the oven. There are numerous commercially available oven thermometers which may be used for this purpose. The top 22 of cover 20 also includes a small opening 64 which receives tab 50 of front panel 46 to close the oven when it is being used. A pair of side handles 66 may be secured to cover sides 24 and 26, respectively, for ease in moving the oven.

In use, the oven is placed on top of the gas burner with base plate 10 resting on top of the conventional burner ring 68. Gas inlet aperture 14 should be located directly above the actual flame. Panel 46 is disengaged from cover 20 by lifting handle 52 so that tab 50 is removed from hole 64. Panel 46 with tray 36 attached thereto is then pulled from the oven and the frozen food package placed within the tray. The tray is then returned to the oven, and panel 46 positioned so that tab 50 engages hole 64.

After the package has been placed in the oven, the flame 69 is turned on to its maximum level. The hot gases from the flame pour through apertures 14 and 32, and because of the high flow rate, pull in air through supply holes 13 in base plate 10. The air flowing in between base 10 and baffle 30 is mixed with the hot gases in the vicinity of apertures 14 and 32, and then diverted by contact with protective plate 43 causing the flow to move radially outwardly as indicated by arrows 72, in the space between tray 36 and baffle 30. The gas flow continues as indicated by the arrows in an upward direction around the food package 37, and then is deflected inwardly again to flow over the top of the package 37. The mixture of gas and air is then exhausted through the louvers 28 which are directed to deflect the output flow toward the back of the oven.

When thermometer 62 indicates that the oven has reached the desired temperature, the user reduces the flame so that the oven is maintained at that temperature as indicated by thermometer 62. Because of the flowing gases as opposed to radiant heat, the desired temperature is reached so quickly that the warm-up time becomes a negligible consideration. Moreover, the flowing gases materially increase the rate of heat transfer so that the actual heating process is also considerably reduced. As a result, the time required to heat a typical frozen package is reduced from approximately forty-five minutes to fifteen minutes.

Although a preferred embodiment of the invention has been illustrated and described, the invention is not so limited and many other modifications thereof will be apparent to those skilled in the art. It is obvious that the nature of the frozen package which is to be heated is not a material part of this invention, which, though of particular use in heating a "TV dinner" would also find utility with numerous other products including some which are not pre-frozen. The use of the thermometer is a desirable feature and has been found to permit accurate regulation of the temperature within the oven, however, for some purposes the oven could be employed without such a thermometer. As to the construction itself, it will be obvious that numerous modifications may be made in the interest of production techniques; accordingly, the invention should not be limited except as defined in the following claims.

What is claimed is:
1. A portable-type oven for use above a gas flame to rapidly heat food products, comprising a housing including a base plate, said base plate including a central gas inlet aperture and air inlet holes, a baffle plate supported in said housing above said base plate, said baffle plate being attached at its periphery to the interior of said housing and including an aperture in registration with said gas inlet aperture, a tray for supporting said food products supported above said baffle plate, gas outlet means in the top of said housing, said tray and baffle plate being positioned within said housing with respect to said base plate whereby all of the gas and air entering through said base plate flows through said baffle plate aperture and around substantially the entire periphery of said tray and over the top thereof prior to exit through said gas outlet means.

2. A portable-type oven according to claim 1, including an oven thermometer for indicating the temperature within said oven.

3. A portable-type oven according to claim 1, wherein said housing includes a removable front panel, handle means connected to said front panel, and means permanently securing said tray and front panel.

4. A portable-type oven according to claim 3, including a plate secured to said tray above said baffle aperture with an air space between said plate and tray.

5. A portable-type oven according to claim 4, including an insulating liner around at least a portion of the interior of said enclosure above said baffle plate.

6. A portable-type oven according to claim 5, including an oven thermometer for indicating the temperature within said oven.

7. A portable-type oven according to claim 4, including means depending downwardly from said tray for supporting said tray at least in part on said baffle plate.

References Cited by the Examiner
UNITED STATES PATENTS

| | | | |
|---|---|---|---|
| 322,418 | 7/1885 | Cain | 126—275 |
| 504,184 | 8/1893 | Wiester | 126—275 |
| 563,928 | 7/1896 | Huenefeld | 126—275 |
| 2,152,924 | 4/1939 | Rutenber | 126—275 |
| 2,454,571 | 11/1948 | Rom | 126—275 |

FREDERICK L. MATTESON, JR., *Primary Examiner.*

E. G. FAVORS, *Assistant Examiner.*